United States Patent [19]

Brockway et al.

[11] Patent Number: 4,561,162

[45] Date of Patent: Dec. 31, 1985

[54] METHOD OF MAKING LOOSE FITTING SUPPLIED AIR RESPIRATION HOOD

[75] Inventors: Brock F. Brockway, Mill Valley; Anthony L. Moretti, San Rafael; Anselmo P. Pellolio, Cotati; Jimmie Rasmussen, Petaluma, all of Calif.

[73] Assignee: E. D. Bullard Company, Sausalito, Calif.

[21] Appl. No.: 616,670

[22] Filed: Jun. 4, 1984

Related U.S. Application Data

[62] Division of Ser. No. 457,527, Jan. 13, 1983, Pat. No. 4,484,575.

[51] Int. Cl.[4] ...................... B21D 39/03; B23P 11/00

[52] U.S. Cl. ..................................... 29/428; 29/157 R

[58] Field of Search ............................. 29/428, 157 R; 128/201.23, 201.22, 201.25, 201.26, 201.29; 2/424

[56] References Cited

U.S. PATENT DOCUMENTS

| | | | |
|---|---|---|---|
| 728,476 | 5/1903 | Langer | 128/201.26 |
| 1,095,089 | 4/1914 | Dinn | 2/424 X |
| 2,666,953 | 1/1954 | Andrews | 29/428 |
| 2,882,894 | 4/1959 | Fahey et al. | 128/201.23 |
| 3,098,233 | 7/1963 | Hoagland | 2/424 |
| 3,557,436 | 1/1971 | Hodes | 29/428 |
| 4,052,984 | 10/1977 | Brockway | 128/201.23 |

FOREIGN PATENT DOCUMENTS

| | | | |
|---|---|---|---|
| 857420 | 9/1940 | France | 128/201.25 |

*Primary Examiner*—Charlie T. Moon
*Attorney, Agent, or Firm*—Robert W. Dilts

[57] ABSTRACT

A loose fitting respirator hood made of flaccid, non-stretchable, air impervious material with a curved optical lens panel interposed in the sidewall thereof. The method of making the hood is disclosed in which curvature is imparted to a relatively stiff lens panel by the flaccid material of the hood. Head engaging members are disclosed for supporting the hood on the head of the wearer. A neck engaging ruff is disclosed which is sealingly mounted about the interior of the hood and can define a hollow annulus with apetures through the sidewall thereof to provide for air distribution to the interior of the hood. A rigid collar member for interconnecting the hood with a suit is disclosed together with the provision of an air filter in communication with a tubular member sealed through the lens panel and extending into proximity with the mouth of the wearer to supply respirable air.

5 Claims, 24 Drawing Figures

METHOD OF MAKING LOOSE FITTING SUPPLIED AIR RESPIRATION HOOD

This is a divison of Ser. No. 457,527, filed Jan. 13, 1983, now U.S. Pat. No. 4,484,575.

DESCRIPTION

BACKGROUND OF THE INVENTION

1. Field of the Invention

This invention relates to positive pressure head enclosures of the type worn by those working in atmospheres contaminated with airborne substances and more particularly to an improved inexpensive lightweight, air impervious, loose fitting hood with improved means for air supply and distribution.

2. Prior Art

Health and safety requirements dictate that those working in atmospheres contaminated with airborne substances utilize an appropriate device for providing contaminant free respiration air. Such devices may take the form of a face mask designed to cover the nose and mouth of the wearer provided with a cannister type filter for removing contaminants from air drawn therethrough during normal resiration. However, it is difficult to obtain a suitable fit of the face mask to the face of the wearer in order to avoid leaks. Thus, various head enclosures have been proposed which are supplied with clean air from a pressurized source. However, such devices according to the teaching of the prior art have been expensive to fabricate and uncomfortable or inconvenient to wear.

It is the object of this invention to provide a positive pressure type head enclosure which is no more expensive than face mask type devices while providing convenience and comfort comparable to or exceeding that of face mask type devices. In this regard it is noted that respiration devices of the positive pressure head enclosure type inherently provide health and safety protection superior to that provided by the face mask type device.

SUMMARY OF THE INVENTION

A loose-fitting supplied air respirator hood according to this invention includes a hollow, generally tubular body portion closed at one end made of flaccid non-stretchable, air-impervious material and dimensioned to enclose the head and neck of the wearer. A curved optical lens panel transparent to a given range of light is interposed in the side wall of the generally tubular body portion adjacent the closed end thereof. The lens panel is made of a resilient, non-stretchable, air-impervious material which is relatively stiff in comparison to the flaccid material of the body portion of the hood. According to the preferred method of making the hood, the lens panel is made generally rectangular with a pair of opposed side edges normally lying in substantially the same given plane. The body portion of the hood includes a flaccid, non-stretchable, air-impervious material and one of the pair of opposed side edges of the lens panel is sealingly fixed to a mounting member along a curved line in a second plane normal to the given plane. According to one embodiment of this invention, the hood includes a forehead engaging band for supporting the hood on the head of the wearer which band is fixed at its opposite ends to the optical lens panel at the end edges thereof. According to another embodiment of this invention, an air distribution means for supplying air to the interior of the hood in the form of a neck-engaging ruff sealingly attached to the interior surface of the body portion of the hood is provided. According to a further embodiment of this invention, a rigid collar member is removably attached to the inner surface of the body portion of the hood.

BRIEF DESCRIPTION OF THE DRAWING

The foregoing and other objects and features of this invention will be more fully understood from the following detailed description of the invention with reference to the attached drawings wherein.

DETAILED DESCRIPTION OF THE INVENTION

Figure 1:
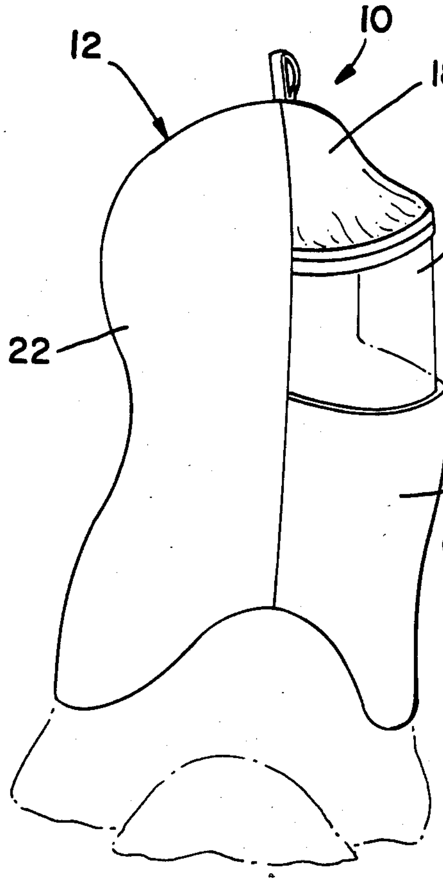
FIG. 1 is a perspective view of a loose-fitting supplied air respirator hood according to one embodiment of this invention with the shoulders of the wearer indicated in phantom.

Referring to FIG. 1, a loose-fitting supplied air respirator hood 10 is shown in perspective view. According to this invention, the hood 10 comprises a hollow, generally tubular body portion 2 closed at one end and made of a flaccid, non-stretchable air-impervious material dimensioned to enclose the head and neck and drape over the shoulders of the wearer. A curved optical lens panel 14, transparent to light in a given frequently and intensity range is interposed in the side wall of the body portion 12 adjacent the closed end thereof. The lens panel is made of a resilient, non-stretchable air-impervious material which is relatively stiff by comparison to the flaccid material of the body portion 12. In the preferred embodiment of this invention, the optical lens panel 14 may be a generally rectangular sheet about 20 mils thick made of a translucent acetate, polyester or polycarbonate material, having a dimension of at least about 4" extending axially of the tubular body portion 12 and a dimension of at least about 6" extending circumferentially of the tubular body portion 12. The body portion of the hood may be made of polyolyfin scrim about 3 mils thick with a polyolefit or polyethelyne coating as sold by Dow Chemical Co. under the trademark TYVEX, for example, or of vinyl sheeting 5–8 mils thick with or without scrim.

Figure 2:
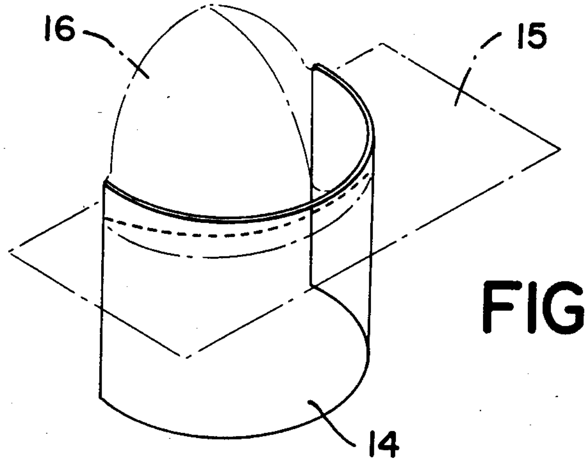
FIG. 2 is a perspective view of the optical lens panel illustrating the preferred interconnection thereof to its mounting member which is illustrated in phantom.

Referring to FIG. 2, the lens panel 14 is interposed in the side wall of the body 12 of the hood 10 in a permanently curved configuration. According to the preferred embodiment of this invention, such curved configuration of the lens panel 14 is maintained by the flaccid material of the body portion 12. Thus, as shown in FIG. 2, the edge of the lens panel 14 adjacent the closed end of the body portion 12 is mounted to the adjacent material of the body portion 12 by first arranging the flaccid material in a fully extended condition in a plane perpendicular to the dimension of the lens panel 14, which extends axially of the body portion 12. Such plane is indicated by the dotted lines 15. The lens panel 14 is then sealingly affixed to such flaccid member along a curved line in the plane 15. When such mounting is completed, the lens panel 14 will be maintained in a curved configuration by the flaccid material immediately adjacent the edge of the lens panel 14 with minimum strain on the remainder of the flaccid material.

Thus, as indicated by the dot-dash lines 16 in FIG. 2, the flaccid material over the top of the concave portion of the lens 14 may be relatively loose and rise to a peak, for example, to accommodate the crown of the head of the wearer. Thus, it is not necessary that the lens panel be made using material and process steps required to provide it with inherent curvature. Instead, the lens panel may be made of relatively thin material and a permanent curvature imparted thereto by its mounting to the flaccid material of the body portion of the hood in accordance with the teaching of this invention.

Figure 6:
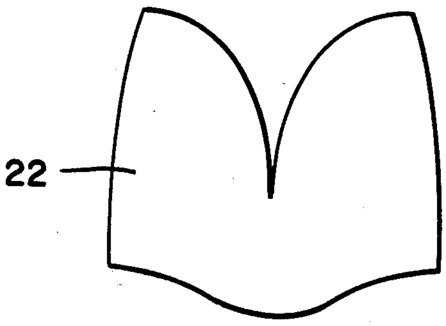
FIG. 6 is a plan view of the pattern for the flaccid back panel of the body portion of the loose-fitting supplied air respirator hood.
Figure 3:
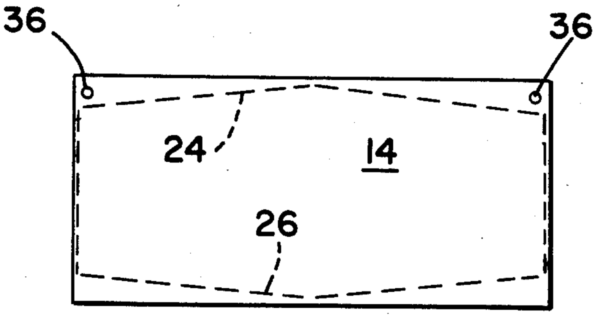
FIG. 3 is a plan view of the optical lens panel with the interconnection thereof to the body portion of the loose-fitting supplied air respirator hood indicated by dotted lines.

Thus, according to the preferred method of fabricating a loose-fitting supplied air respirator hood according to this invention, the lens panel 14 is made of thin, relatively stiff material cut into a rectangular shape, as best shown in FIG. 3. The flaccid body portion 12 of the hood is made in three sections which are sealingly fixed to each other and to the lens panel 14 along their edges. Thus, referring to FIG. 4, a plan view for a pattern of flaccid material adapted to serve as a mounting member 18 for the edge of the optical panel 14 adjacent the closed end of the tubular body 12 is shown. Similarly, in FIG. 5, a plan view of a pattern of flaccid material for attachment to the opposite edge of the lens member 14 as a skirt member 20 is shown. In FIG. 6, the plan view of a pattern of flaccid material for use in forming the entire back panel 22 of the body portion 12 is shown.

Figure 4:
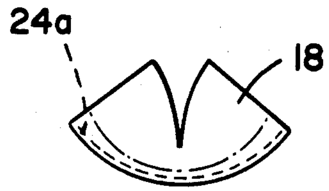
FIG. 4 is a plan view of the pattern for the flaccid support member with the line of interconnection thereof to the optical lens panel indicated by dotted lines.
Figure 5:
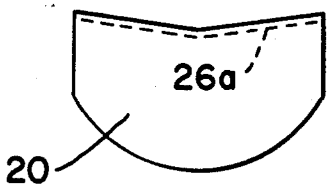
FIG. 5 is a plan view of the pattern for the flaccid skirt member of the body portion of the hood with the line of interconnection thereof to the optical lens panel indicated by dotted lines.

The lens panel 14 of FIG. 3 is shown in somewhat larger scale than the patterns of flaccid material shown in FIGS. 4, 5 and 6. However, it will be understood that these components actually have the relative dimensions shown in FIG. 1. Thus, the dotted line 24 in FIG. 3 and dotted line 24*a* in FIG. 4, represent the line along which the lens member 14 and support member 18 are sealingly interconnected. Similarly, the dotted line 26 in FIG. 3 and dotted line 26*a* in FIG. 5 represent the line along which the lens panel 14 and skirt member 20 are sealingly interconnected. It will be undestood that the skirt member 20 is arranged in a plane parallel to the plane of the lens member 14 when it is interconnected therewith and thus the flaccid material of the skirt member 20 does not impart any curvature to the lens panel 14. Instead, such curvature is imparted to the lens panel 14 by its interconnection with the support member 18, as discussed hereinabove with the dot-dash line in FIG. 4 indicating the curvature of the lens panel 14.

Figure 7:
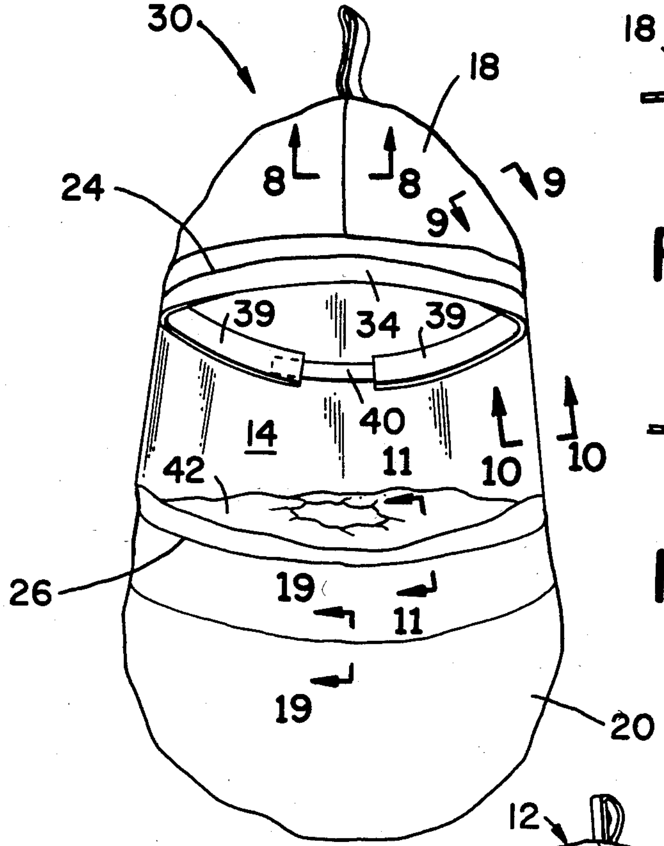
FIG. 7 is a front view in elevation of a loose-fitting supplied air respirator hood according to a preferred embodiment of this invention.
Figure 8:
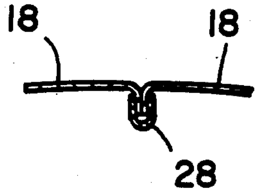
FIG. 8 is an enlarged fragmentary cross-sectional view taken along line 8—8 of FIG. 7.
Figure 9:
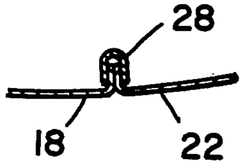
FIG. 9 is an enlarged fragmentary cross-sectional view taken along line 9—9 of FIG. 7.
Figure 10:
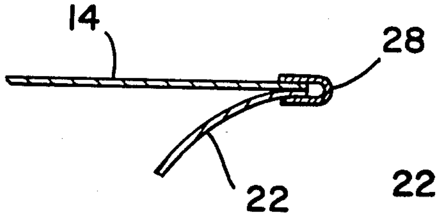
FIG. 10 is an enlarged fragmentary cross-sectional view taken along line 10—10 of FIG. 7.
Figure 11:
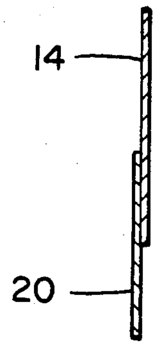
FIG. 11 is an enlarged fragmentary cross-sectional view taken along line 11—11 of FIG. 7.

Referring to FIGS. 7 and 11, the sealing interconnection along the lines 24, 24*a* and 26, 26*a* may be accomplished by machine stitching the members firmly to each other. Since a positive air pressure will be established within the hood, an outward flow of air will tend to occur if any leakage is possible due to such stitching. Thus, the entry of undesirable air-borne substances into the hood will be prevented. As best shown in FIGS. 8, 9 and 10, the interconnection of the edges of the support member 18, skirt member 20 and back panel 22, to each other and to the end edges of the lens panel 14 is accomplished by means of machine sewn seams bridged by strips 28 of air-impervious maaterial having their sides caught in the seam against the exterior surfaces thereof.

Figure 12:
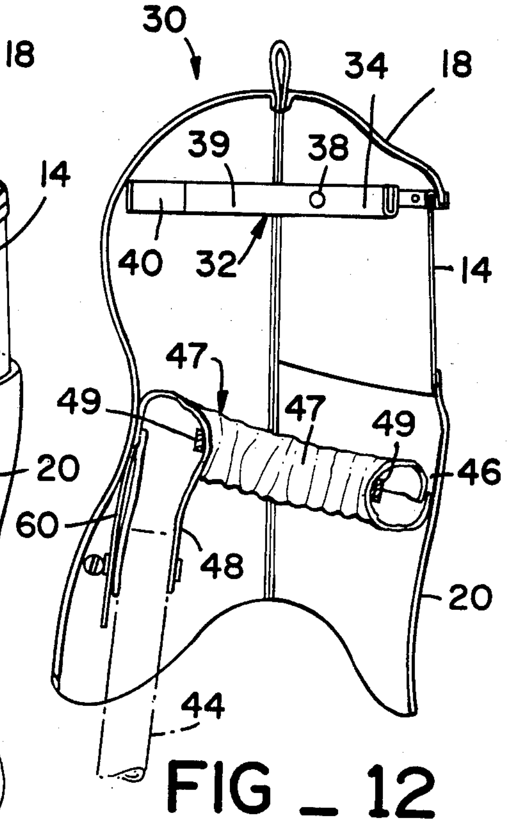
FIG. 12 is a cross-sectional view of the loose-fitting supplied air respirator hood of FIG. 7.

Referring to FIG. 12, an embodiment 30 of this invention including a headband 32 for supporting the loose-fitting supplied air respirator hood on the cranial portion of the head of the wearer is shown. The headband 32 includes a forehead engaging portion 34 having a length which is less than the circumferentially extending dimension of the optical lens panel 14. The forehead engaging portion 34 of the headband 32 is pivotally mounted at the upper corners of the optical lens panel 14. Thus, referring to FIG. 3, a pair of holes 36 may be provided at the upper corners of the lens panel 14 and a pair of pins 38 may pass through the ends of the forehead engaging portion 34 and the holes 36 to provide a pivotal interconnection between the lens panel 14 and the forehead engaging portion 34 of the headband 32.

The remainder of the headband 32 may comprise integral extensions 39 of the ends of the forehead engaging portion 34. Such extensions 39 may be interconnected with each other by means of an elastic member 40 in order to accommodate size variations between the heads of different wearers. Alternatively, such extensions 39 may be interconnected with each other by buckle means or by cooperating members of the type sold under the trademark "VELCRO" to provide for the manual adjustment in size of the headband 32.

The embodiment 30 of this invention shown in FIGS. 7 and 12 may also be provided with an air distribution system in the form of a neck-engaging cuff or ruff 42. The ruff 42 comprises a hollow, tubular member made of flaccid, air-impervious material formed into a ring or annulus and sealingly affixed about the inner surface of the body portion 12 of the hood between the lens panel 14 and the open end thereof. Air is introduced into the hollow tubular annulus comprising the ruff 42 as by means of an air hose 44, for example. Apertures 46 are provided through the wall of the hollow tubular annulus or ruff 42 beneath the optical panel 14 and above the sealing interconnection between the ruff 42 and the inner surface of the body portion 12 of the hood. Thus, as indicated by the arrows 45 in FIGS. 13 and 14, air under pressure will pass through the apertures 46 and upwardly over the inner surface of the lens panel 14 to provide respiration air for the wearer. The flow of air will prevent fogging of the optical panel 14 due to the breathing of the wearer.

As best shown in FIG. 12, the flaccid material of which the annulus or ruff 42 is made will tend to wrinkle about the neck of the wearer, providing passageways through which air from within the hood 30 may be exhausted, thus insuring a continuous flow of fresh respirable air to the wearer. The outward flow of air through such passageways will prevent the entry of air borne substances from the environment into the hood therethrough. At the same time, a balancing of the air pressure within the ruff 42 with the air pressure within the body portion 12 of the hood will tend to occur thereby insuring that a positive pressure will be maintained within the body 12 of the hood with respect to the environment.

Figure 15:
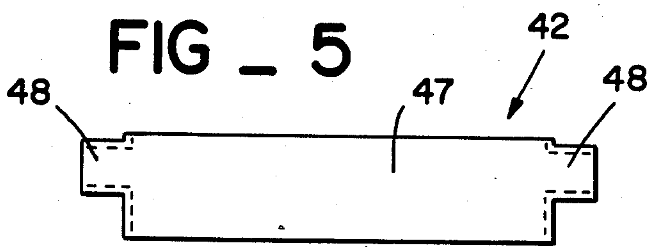
FIG. 15 is a plan view of the pattern used in making the air distribution system of FIGS. 12–14.

Referring to FIG. 15 a plan view of a pattern of flaccid, air-impervious material suitable for use in fabricating the ruff 42 according to this invention is shown. Such pattern comprises an elongated rectangular panel 47 having a first rectangular tab 48 projecting from one end thereof and a second identical rectangular tab 48 projecting from the other end thereof. The ruff 42 is fabricated by bringing the tabs 48 into registry with each other and sealingly fixing them to each other along their sides leaving the ends open.

Figure 16:
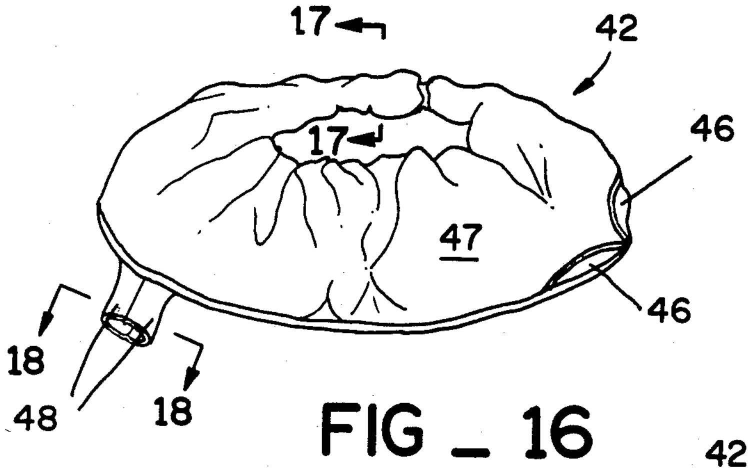
FIG. 16 is a perspective view of the air distribution system prior to being mounted within the loose-fitting supplied air respirator hood of FIGS. 12–14.
Figure 18:
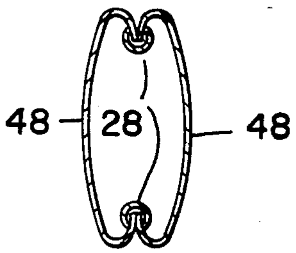
FIG. 18 is an enlarged cross-sectional view taken along line 18—18 of FIG. 16.

The sleeve-like member thus formed is then turned inside out. Thus, referring to FIGS. 16 and 18, the seams will project inwardly of the sleeve formed by the joined tabs 48. Such seams may be formed by stitching the edges of the tabs 48 to each other with a bridging strip 28 of air-impervious material as described hereinabove with respect to FIGS. 8–10.

Figure 17:
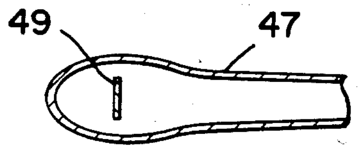
FIG. 17 is an enlarge.fragmentary cross-sectional view taken along line 17—17 of FIG. 16.
Figure 19:
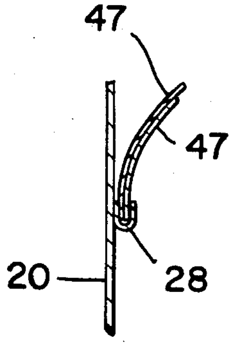
FIG. 19 is an enlarged fragmentary cross-sectional view taken along line 19—19 of FIG. 7.

The long edges of the panel 47 are then brought into registry with each other to form a hollow annulus as best shown in FIG. 17 with the interior of the annulus communicating with the interior of the sleeve formed by the tabs 48. Referring to FIG. 19 the registered long edges of the panel 47 may then be sealingly fixed to each other and to the interior surface of the skirt member 20 and back panel 22.

Figure 13:
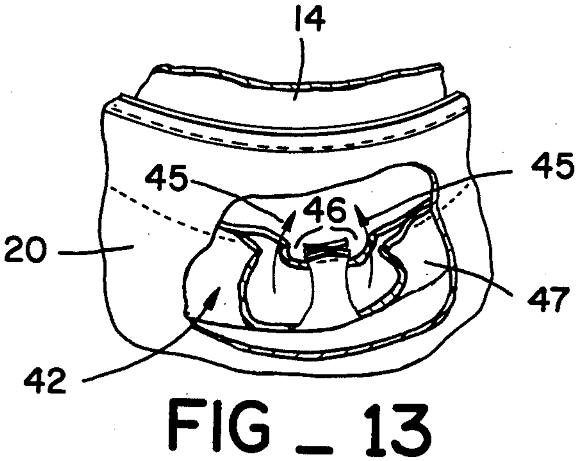
FIG. 13 is an enlarged fragmentary perspective view of the lower front portion of the loose-fitting supplied air respirator hood of FIG. 12 partially broken away to show features of the air distribution system thereof.
Figure 14:
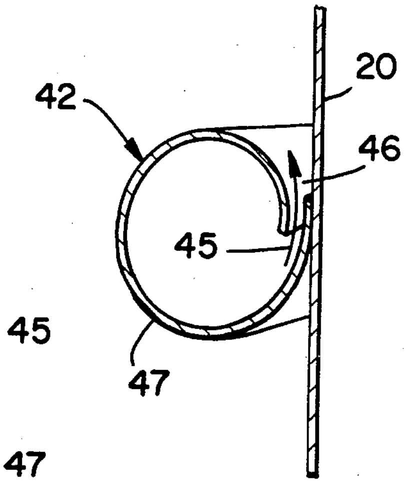
FIG. 14 is an enlarged cross-sectional view of FIG. 13.

In the preferred embodiment, the registered edges of the panel 47 have a bridging strip 28 applied thereto and such edges together with the bridging strip are sewn about the inner surface of the skirt member and back panel 20 beneath the optical lens as best shown in FIGS. 7 and 12. Referring to FIGS. 13 and 14 the upper most side edge of the panel 47 may be released from the bridging strip 28 at points located generally centrally of the skirt member 20 beneath the optical lens 14 to provide apertures 46 through which air introduced into the ruff can escape in an upperwardly direction to flush over the inner surface of the optical lens 14. As best shown in FIG. 12 the sleeve formed by the tabs 48 provides for convenient attachment to an air hose 44 for supplying respiration air under pressure to the ruff 42.

Referring again to FIGS. 12 and 17 an annular elastic band 49 may be contained within the ruff to insure that the wrinkled inner periphery of the ruff 42 is maintained in intimate contact with the neck of the wearer. Such elastic band will also facilitate the fabrication of the ruff 42.

Figure 20:
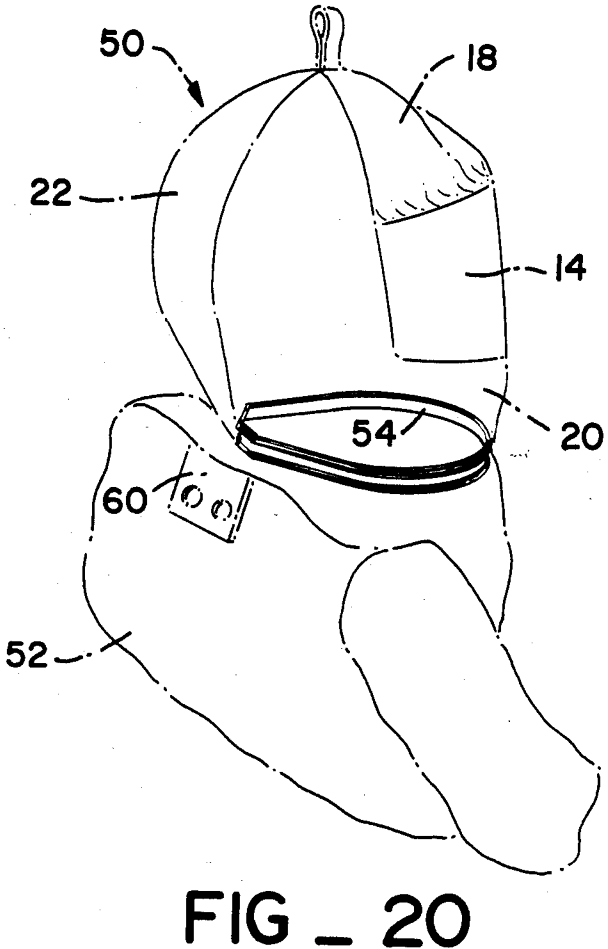
FIG. 20 is a perspective view of a loose-fitting supplied air respirator system according to a further embodiment of this invention with a portion of the shoulders and arm of the wearer indicated in phantom.

Referring to FIG. 20 an embodiment 50 of the loose-fitting supplied air respirator hood of this invention is shown in which the head band and ruff are omitted. This embodiment 50 of the invention is specifically adapted for use with an air-impervious suit 52 covering the body of the wearer. In such use it is desirable to sealingly attach the skirt member 20 and lower portion of the back panel 22 to the suit 52 at the neck opening thereof.

Figure 21:
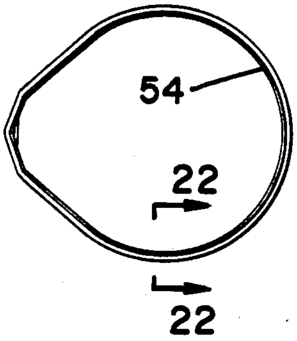
FIG. 21 is a plan view of the collar member of FIG. 20.

To this end a rigid annular collar 54 is provided which is dimensioned to be snuggly received within the hollow tubular lower portion of the hood 50 through the open end thereof. Similarly the neck opening of the suit 52 is dimensioned to receive the collar 54. Referring to FIG. 21 the collar 54 may be oval or generally egg-shaped in plan view. Thus the largest diameter portion of the collar surrounds the neck of the wearer with the elongated dimension of the oval extending front to back locating the smaller diameter portion at the nape of the neck. As will be more fully described hereinafter, this shape facilitates the provision of an air hose or other air distribution means adapted to pass within the collar at the nape of the neck of the wearer.

Figure 22:
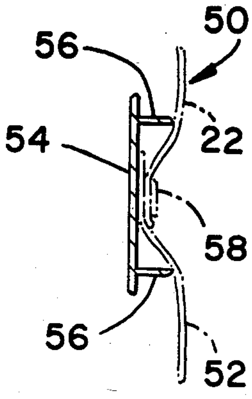
FIG. 22 is an enlarged cross-sectional view taken along line 22—22 of FIG. 21.

Referring to FIG. 22 the collar 54 my comprise a ring or band of rigid light-weight material such as plastic or the like. A pair of lands 56 project from the outer surface of the band or ring in order to provide an outwardly opening groove to facilitate the sealing of the collar to the hood 50 and suit 52. Thus the collar 54 may be inserted within the lower portion of the hood 50 and the hood with the collar 54 inserted therein may be inserted within the neck opening of the suit 52. The overlapping edges of the hood 50 and suite 52 may then be removably sealed to the exterior of the collar as by means of an elastic band 58, for example, resiliently retaining the overlapped edges of the hood 50 and suit 52 within the groove formed by the lands 56.

According to this embodiment of the invention respiration air introduced into the hood 50 will flow from the bond 50 into the interior of the suit 52 from which it may be released through the cuffs of the sleeves and pant legs or other appropriate vent. The positive air pressure within the hood 50 will end to inflate it about the head of the wearer. Thus the hood 50 will not move with the head of the wearer when turned from side to side, for example. This is desirable since the hood is fixed to the suit by means of the collar and the use of a head band fixing the hood to the cranial portion of the head of the wearer would tend to restrict the movement of the head of the wearer.

An air distribution ruff 42 as described hereinabove may be included in the embodiment 50 of this invention shown in FIG. 20 if desired. It has been found that the use of an air distribution ruff 42 will contribute to the comfort of the hood 50 in use by tending to insure the inflation of the hood 50 and the free-movement of the head of the wearer within the hood 50.

Figure 23:
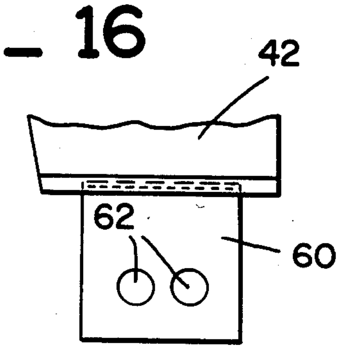
FIG. 23 is a fragmentary front view in elevation of the air supply hose support tab of FIG. 20.

As shown in FIGS. 12, 20 and 23 a mounting tab 60 for use in supporting the air hose 44 on the back panel 22 of the hood may be provided. The tab 60 may be made of plastic or other light-weight rigid material fixed to the back panel 22 at one edge of the tab 60. The tab 60 may be provided with one or more apertures 62 in order to accomodate a hose clamp or other convenient means for fixing the free end of the air supply hose 44 to the tab in communication with the interior of the hood either directly or through an air distribution ruff 42.

Figure 24:
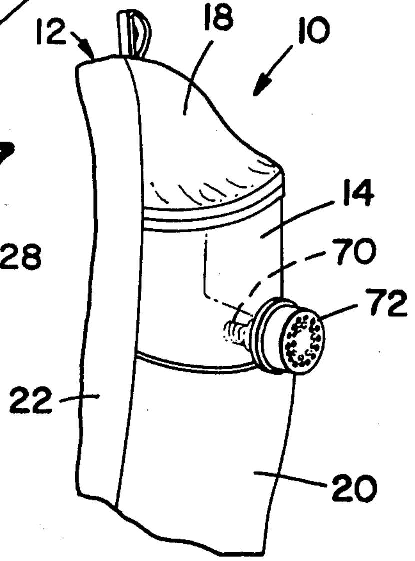
FIG. 24 is a fragmentary perspective view of a loose-fitting respirator hood according to the embodiment of FIG. 1 fitted with a mouthpiece and filter to enable the wearer to obtain breathable air from the atmosphere.

Referring to FIG. 24 a hood 10 according to any of the embodiments of this invention may be provided with a mouthpiece 70 and filter 72 sealingly mounted through the optical lens panel 14, with the mouthpiece 70 extending within the hood into position for access by the wearer and the filter outside the hood. Thus, if the supply of air to the hood 10 should fail for any reason, the wearer can draw respirable air from the atmosphere through the filter 72. The filter 72 must, of course, be selected for use in removing the particular air borne contaminate to which the wearer is exposed and in appropriate circumstances it may be possible to make effective use of a hood 10 with mouthpiece 70 and filter 72 and without a supply of pressurized air.

It is believed that persons skilled in the art will make various obvious combinations and modifications of the embodiments of this invention as disclosed herein without departing from the scope of the following claims.

What is claimed is:

1. The method of making a loose fitting respirator hood consisting essentially of the steps of:

(a) forming a generally rectangular optical lens panel of thin, resilient, non-stretchable, air-impervious material transparent to a given range of light with a first pair of the side edges thereof normally lying substantially in a first plane;

(b) forming a mounting member of flaccid, non-stretchable, air-impervious material;

(c) sealingly fixing a first one of a second pair of side edges of said lens panel to said mounting member along a curved line in a second plane normal to said first plane;

(d) forming a skirt of flaccid, air-impervious material and sealingly fixing said skirt to a second one of said second pair of side edges of said lens panel opposite said first one of said second pair of side edges thereof;

(e) forming a back panel of flaccid, air-impervious material and sealingly fixing each of the side edges of said back panel to a different one of the side edges of said first pair of side edges of said lens panel and to a corresponding edge of said skirt member;

(f) sealingly fixing edges of said mounting member to said back panel to form a hollow generally tubular structure closed at one end; and (g) providing means supplying pre-filtered air to the interior of said hood.

2. The method of claim 1 wherein said step of providing means supplying pre-filtered air to the interior of said hood comprises the steps of providing a tubular member dimensioned to be received in the mouth of the wearer, mounting an air filter means in sealed communication with one end of the said tubular member and sealing said tubular member through said optical lens panel withthe other end thereof extending into proximity with the mouth of the wearer.

3. The method of claim 1 including the further steps of forming a ruff member of flaccid, non-stretchable, air impervious material defining an annulus for engaging the neck of the wearer and sealingly fixing the outer periphery of said annulus about the linear surface of said generally tubular structure on the opposite side of said lens panel from said closed end of said tubular structure.

4. The method of claim 3 wherein the step of providing means supplying pre-filtered air to the interior of said hood includes the further step of forming said ruff to define a hollow annulus with a first aperture through the sidewall thereof adjacent said optical lens and a second aperture through the sidewall thereof adapted to be coupled to a source of pressurized pre-filtered air.

5. The method of claim 3 including the further step of providing an annular elastic band dimensioned to resiliently engage the neck of the wearer affixed to said annnular defined by said ruff members at the inner periphery thereof.

* * * * *